(12) United States Patent
Scriven et al.

(10) Patent No.: US 8,596,698 B1
(45) Date of Patent: Dec. 3, 2013

(54) TELESCOPING HANDLE FOR OUTBOARD MOTOR

(76) Inventors: Rick Scriven, Stafford, VA (US); James McShane, Erie, PA (US)

( * ) Notice: Subject to any disclaimer, the term of this patent is extended or adjusted under 35 U.S.C. 154(b) by 15 days.

(21) Appl. No.: 13/339,224

(22) Filed: Dec. 28, 2011

Related U.S. Application Data

(60) Provisional application No. 61/460,204, filed on Dec. 28, 2010.

(51) Int. Cl.
*B65G 7/00* (2006.01)
(52) U.S. Cl.
USPC .................................................. 294/15; 440/6
(58) Field of Classification Search
USPC .............. 294/15, 25; 440/6, 58, 59, 61 S, 63; 114/144 R, 146
See application file for complete search history.

(56) References Cited

U.S. PATENT DOCUMENTS

| | | | | |
|---|---|---|---|---|
| 4,373,920 A * | 2/1983 | Hall et al. | ......................... | 440/59 |
| 5,002,510 A * | 3/1991 | Rump | ......................... | 440/61 R |
| 6,481,767 B2 * | 11/2002 | Pool | ................................ | 294/16 |
| 2006/0040573 A1 * | 2/2006 | Kobayashi et al. | ............. | 440/84 |
| 2006/0258233 A1 * | 11/2006 | Wilson et al. | ................... | 440/53 |
| 2010/0273369 A1 * | 10/2010 | Furuya et al. | ................... | 440/63 |

* cited by examiner

*Primary Examiner* — Paul T Chin
(74) *Attorney, Agent, or Firm* — Richard K Thomson

(57) ABSTRACT

A two-piece telescoping handle mounts on the threaded ends of a tilt-tube of an outboard motor, moving from a first unobtrusive, retracted position to an extended position where the handle can be readily gripped to remove/carry the outboard motor, as needed.

6 Claims, 2 Drawing Sheets

TELESCOPING HANDLE FOR OUTBOARD MOTOR

Applicant claims the benefit of provisional patent appl. No. 61/460,204 filed Dec. 28, 2010.

BACKGROUND AND SUMMARY OF THE INVENTION

The present invention is directed to the field of emergency rescues. More particularly, the present invention is directed to a handle that can readily be assembled to an outboard motor to allow it to be readily carted across rugged terrain for attachment to an inflatable craft to enable a water rescue.

The life of an EMT (emergency medical technician) would be greatly simplified if people would restrict their activities to choking on a chunk of beef or stepping off a dock in shallow water in the middle of summer. Unfortunately, people go in search of unseen beauty and wind up stranding themselves in places that are as remote as they are beautiful. Accordingly, it often requires the EMT to trek across long stretches of difficult terrain to access the edge of the lake (or other body of water) the victim finds themselves stranded in; and, if this was not taxing enough, it is often necessary to cart an outboard motor and an inflatable rescue boat to allow the EMT to reach his stranded rescuee.

Carrying a conventional outboard motor is a bit like wrestling a giant slug: there really is no good place to get your hands on one and, due to their propensity to spill fuel (an oil, gas mixture), they are equally slippery. It is among the objects of the present invention to equip a conventional outboard motor with handles to enable it to readily be carried by two persons and, in a pinch, by one person (depending on the size and weight of the motor). It will be appreciated that while the handle of the present invention has been disclosed as particularly useful for EMT rescues, it can also be of use in removing an outboard motor for servicing, installation, remounting, and the like.

The present invention comprises a two-piece telescoping handle assembly for attachment to an external thread on a tilt-tube of an outboard motor, the two-piece telescoping handle comprising: a) a first handle sleeve having an internal thread which is secured to the external thread of the tilt-tube on the outboard motor; b) a second handle securement rod for insertion within the tilt-tube of the outboard motor; c) securement means for attaching the first handle sleeve to the second handle securement rod. Preferably, the securement means comprises an external thread on the handle securement rod and a mating internal thread within the first handle sleeve. Most preferably, the internal thread within the first handle sleeve comprises two lengths of mating thread allowing the external thread on the second handle securement thread to be secured in a first retracted position and a second extended position. A rubber grommet is secured in a groove in a proximate end of the second handle securement rod to prevent the first handle sleeve from becoming dislodged from the proximate end of the second handle securement rod. It will be appreciated that one telescoping handle assembly is secured to each end of the threaded tilt-tube to facilitate carting the outboard motor by one, or more preferably, two people.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1B:
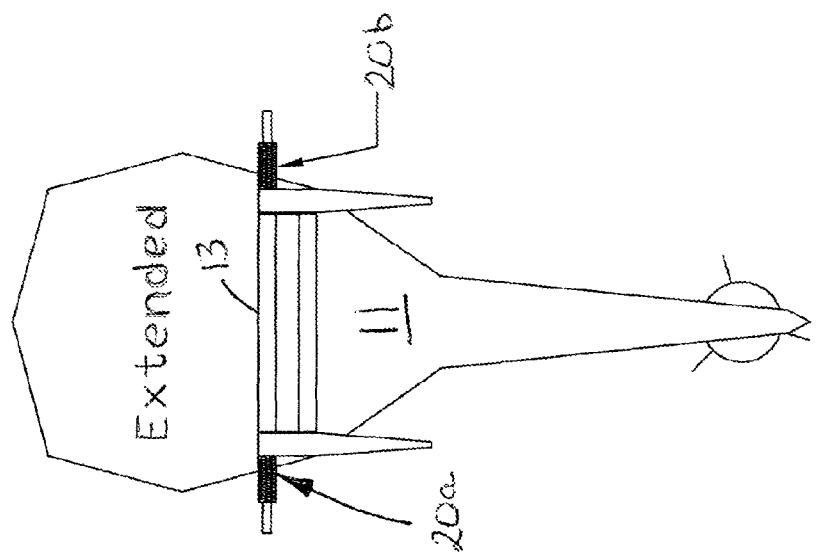
FIG. 1B is a front schematic view of a first embodiment showing the handles in an extended position.
Figure 1A:
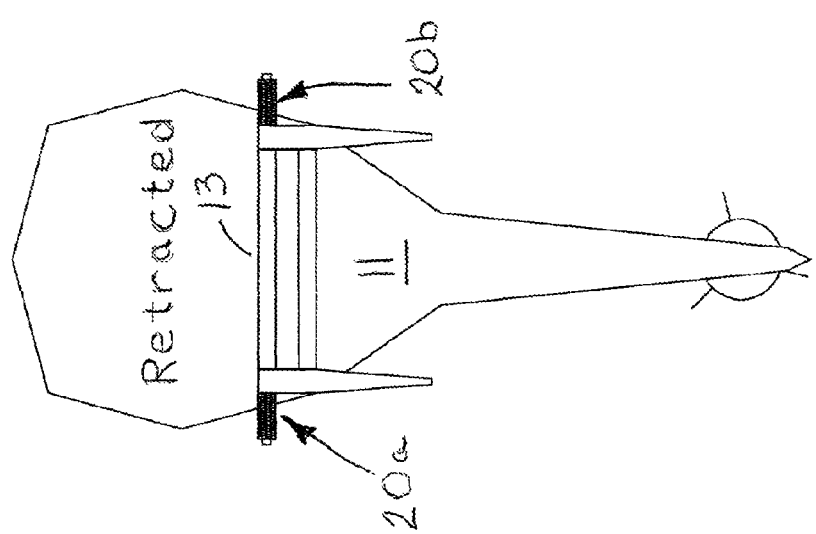
FIG. 1A is a front schematic view of a first embodiment of the outboard motor handle of the present invention showing the handles in a retracted position.
Figure 2:
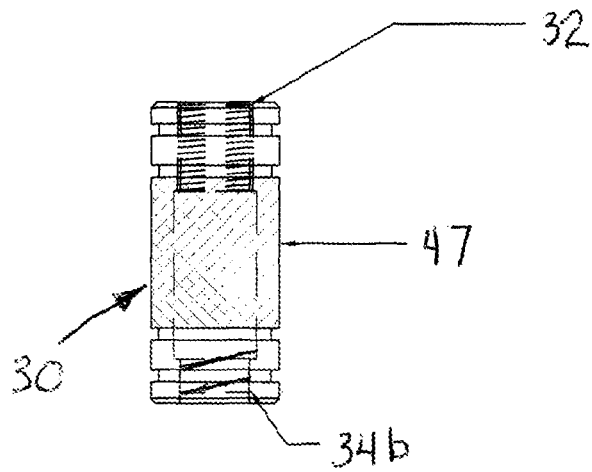
FIG. 2 is a front view of the handle sleeve of the first embodiment.

A first embodiment of the telescoping handle assembly of the present invention is depicted in FIGS. 1-3 generally at 20. Two handle assemblies 20a and 20b are shown attached to either end of externally threaded tilt-tube 13 in a retracted position in FIG. 1A and an extended position in FIG. 1B. Conventionally, tilt-tube 13 is commonly used to pivotally mount the outboard motor 11 in a receiving channel on the transom (not shown) of a boat. The threaded ends are useful for attaching steering/tilting cables, and the like.

Figures 3A, 3B:
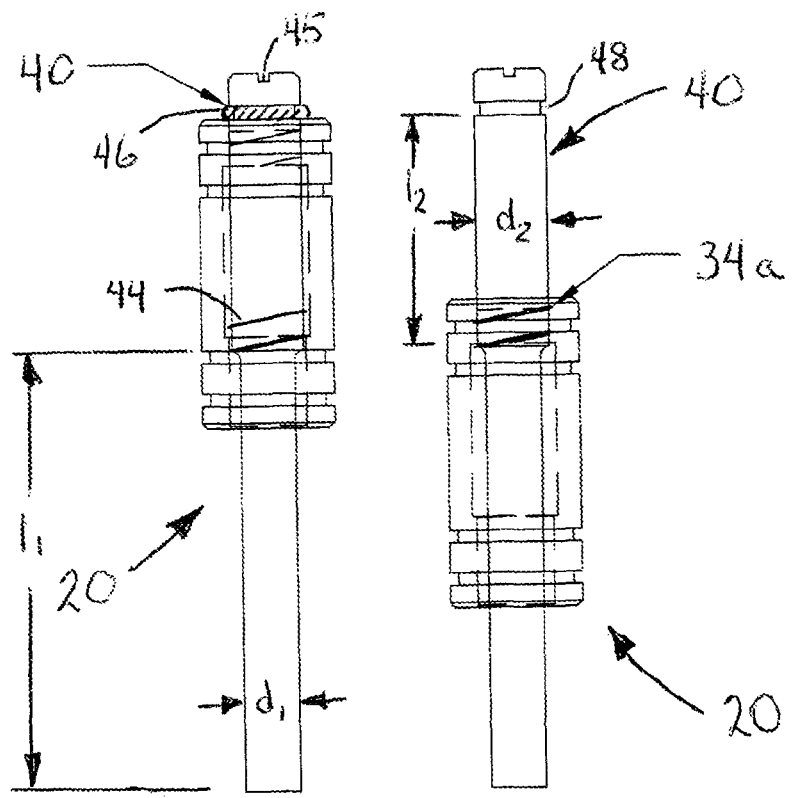
FIG. 3A is an front view of the handle sleeve on the handle retention rod shown in the retracted position; and, FIG. 3B is a front view of the assembled handle in the extended position.

Two-piece telescoping assemblies 20a, 20b comprise a first exterior handle sleeve 30 (FIG. 2) repositionably mounted on second handle securement rod 40 (FIGS. 3A, 3B). Handle sleeve 30 has an internal standard thread 32 which matingly receives the external thread on the ends of tilt-tube 13. In addition, an internal custom thread is formed in two lengths at 34a (FIG. 3B) and 34b (FIG. 2). The central external surface 47 is knurled to facilitate grasping in all conditions. Telescoping internal securement rod 40 has a first length $l_2$ with a first diameter $d_1$ and a second length $l_2$ with a second slightly larger diameter $d_2$. The first diameter $d_1$ fits inside tilt-tube 13 and strengthens the handle 20. The larger diameter $d_2$ has a specialty thread 44 which matingly engages either of the two threaded lengths 34a, 34b. A grommet or O-ring 46 is positioned in groove 48 to prevent removal of securement rod 40 from handle sleeve 30 when moving rod 40 from the extended to the retracted position. The slot 45 in the exposed end of securement rod 40 permits a coin, knife blade or screw driver (where available) to "encourage" rotation of rod 40, should salt water encrusting resist rotation. When in the retracted position, handle assemblies 20a, 20b (FIG. 1A) extend approximately 4.25" beyond the ends of the tilt tube 13 so as to eliminate/minimize interference when not in use. When in the extended position, handle assemblies 20a, 20b extend up to a total of 16" to afford adequate grippable surface area to maneuver on and off of the boat transom to facilitate working on and reinstalling the outboard motor 11.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A two-piece handle assembly for attachment to an external thread on a tilt-tube of an outboard motor, said two-piece handle comprising:
   a) a first handle sleeve having an internal thread which is secured to the external thread of the tilt-tube on the outboard motor;
   b) a second handle securement rod for insertion within the tilt-tube of the outboard motor and which extends through said first handle sleeve;

c) securement means for attaching said first handle sleeve to said second handle securement rod.

2. The two-piece handle assembly of claim 1 wherein said securement means comprises an external thread on said handle securement rod and a mating internal thread within said first handle sleeve.

3. The two-piece handle assembly of claim 2 wherein said internal thread within said first handle sleeve comprises two lengths of mating thread allowing said external thread on said second handle securement thread to be secured in a first retracted position and to telescope to a second extended position.

4. The two-piece handle assembly of claim 3 further comprising a rubber grommet secured in a groove in a proximate end of said second handle securement rod to prevent said first handle sleeve from becoming dislodged from said proximate end of said second handle securement rod.

5. The two-piece handle assembly of claim 1 wherein one handle assembly is secured to each end of the threaded tilt-tube.

6. The two-piece handle assembly of claim 1 wherein each handle assembly permits said first handle sleeve to telescope on said second handle securement rod.

\* \* \* \* \*